United States Patent
Lai et al.

(10) Patent No.: US 7,649,281 B2
(45) Date of Patent: Jan. 19, 2010

(54) LOW POWER LOSS UNINTERRUPTIBLE POWER SUPPLY

(75) Inventors: Yuan-Fang Lai, Taoyuan (TW); Ying-Sung Chang, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/537,242

(22) Filed: Sep. 29, 2006

(65) Prior Publication Data

US 2007/0241616 A1    Oct. 18, 2007

(30) Foreign Application Priority Data

Apr. 17, 2006  (TW) ................. 95113695 A

(51) Int. Cl.
*H02J 9/00*   (2006.01)
(52) U.S. Cl. ....................................... 307/66
(58) Field of Classification Search ............ 307/66
See application file for complete search history.

(56) References Cited

U.S. PATENT DOCUMENTS

| | | | | |
|---|---|---|---|---|
| 4,763,014 A | * | 8/1988 | Model et al. ............. | 307/66 |
| 5,396,165 A | * | 3/1995 | Hwang et al. ............ | 323/210 |
| 5,633,539 A | * | 5/1997 | Tassitino, Jr. ............ | 307/64 |
| 5,737,204 A | * | 4/1998 | Brown ...................... | 363/89 |
| 5,784,268 A | * | 7/1998 | Steffek et al. ............. | 363/55 |
| 5,790,391 A | * | 8/1998 | Stich et al. ............... | 363/24 |
| 5,801,937 A | * | 9/1998 | Gold et al. ............... | 363/141 |
| 5,978,236 A | * | 11/1999 | Faberman et al. ........ | 363/37 |
| 6,147,882 A | * | 11/2000 | Huber et al. ............. | 363/39 |
| 6,169,669 B1 | * | 1/2001 | Choudhury .............. | 363/37 |
| 6,278,202 B1 | * | 8/2001 | Sakagawa et al. ........ | 307/72 |
| 6,288,916 B1 | * | 9/2001 | Liu et al. ................. | 363/37 |
| 6,879,061 B2 | * | 4/2005 | Haneda et al. ........... | 307/102 |
| 7,005,759 B2 | * | 2/2006 | Ying et al. ............... | 307/64 |
| 7,269,038 B2 | * | 9/2007 | Shekhawat et al. ....... | 363/71 |
| 7,327,587 B2 | * | 2/2008 | Mhaskar et al. .......... | 363/37 |
| 7,375,989 B2 | * | 5/2008 | Colombi et al. .......... | 363/44 |
| 2003/0043608 A1 | * | 3/2003 | Huang ..................... | 363/89 |

* cited by examiner

*Primary Examiner*—Stephen W Jackson
*Assistant Examiner*—Adi Amrany

(57) ABSTRACT

The present invention presents an uninterruptible power supply device including an input circuit coupled between a voltage input terminal and a rectifier circuit, in which the input circuit includes a boost choke being charged with an AC current received from the voltage input terminal for providing a boosted AC voltage to the rectifier circuit. The rectifier circuit is configured to convert the boosted AC voltage into an intermediate DC voltage. The intermediate DC voltage is converted through an inverter into a poly-phase output AC voltage for use by a load.

17 Claims, 4 Drawing Sheets

LOW POWER LOSS UNINTERRUPTIBLE POWER SUPPLY

FIELD OF THE INVENTION

The present invention is related to an uninterruptible power supply, and more particularly to an uninterruptible power supply characterized in terms of low cost and low power loss.

BACKGROUND OF THE INVENTION

For various electronic devices, a clean and continual power supply is a sine qua non for maintaining a normal performance. To prevent the faulty operation of an electronic device as a result of the interruption or abnormality of the AC power provided by an ordinary power source, an uninterruptible power supply is developed to provide backup power to maintain the normal operation of an electronic device while the input AC power of the electronic device can not be supplied normally.

FIG. 1 illustrates a circuit diagram showing the construction of a conventional on-line uninterruptible power supply, in which an input AC voltage Vin is supplied by a utility power source or a commercial power source. As shown in FIG. 1, a conventional on-line UPS is made up of a circuit breaker 110, a boost rectifier circuit 120, a battery 130, and an inverter circuit 140, in which the boost rectifier circuit 120, the battery 130, and the inverter circuit 140 are connected together through buses 10a and 10b. The circuit breaker 110 is coupled between a voltage input terminal 101 and the boost rectifier circuit 120 for receiving the input AC voltage Vin. The boost rectifier circuit 120 is coupled between the circuit breaker 110 and the input terminals of the inverter circuit 140 for rectifying the input AC voltage Vin and generating boosted DC voltages on buses 10a and 10b. The boost rectifier circuit 120 includes a rectifier 121 formed by bridge-connected rectifying diodes for performing a half-wave rectification or full-wave rectification to the input AC voltage Vin so as to generate a rectified DC voltage with a predetermined voltage level. The boost rectifier circuit 120 further includes: a positive boost converter 122 including a current monitor CTA1, a boost inductor L11, a transistor switch Q11, and a diode D11; a negative boost converter 123 including a current monitor CTA2, a boost inductor L12, a transistor switch Q12, and a diode D12; output capacitors C11 and C12; and a current-limiting circuit 124. The positive boost converter 122 is coupled to a positive output terminal of the rectifier 121, in which the boost inductor L11 is configured to receive a current from the rectifier 121 during the positive half-cycle of the input AC voltage and discharge a current to the output capacitor C11 through the diode D11 according to the on/off operations of the transistor switch Q11, and thereby generating a positive DC voltage across the output capacitor C11. The negative boost converter 123 is coupled to a negative output terminal of the rectifier 121, in which the boost inductor L12 is configured to receive a current from the rectifier 121 during the negative half-cycle of the input AC voltage and discharge a current to the output capacitor C12 through the diode D12 according to the on/off operations of the transistor switch Q12, and thereby generating a negative DC voltage across the output capacitor C12. The current-limiting circuit 124 is made of a first silicon-controlled rectifier (or SCR) 151 and a second silicon-controlled rectifier 152 that are connected in parallel with each other and manipulated by a microcontroller (not shown) to allow the battery 130 provide a current to the boost inductors L11 and L12 when the input AC voltage is abnormal or interrupted. Therefore, the battery 130 can respectively provide a positive DC voltage and a negative DC voltage to the input terminal of the positive boost converter 122 and the input terminal of the negative boost converter 123, and thereby respectively generating a regulated output voltage across the output capacitor C11, C12 under the manipulation of the microcontroller. In addition, a resistor R11 is connected in series between the bus 10a and the first silicon-controlled rectifier 151 for protecting the battery 130 from the negative electrochemical effect as a result of the surging inrush current and thereby preventing the lifetime of the battery 130 from being shortened.

The purpose of the battery 130 is to provide backup power to continue supplying power to a load (not shown) when the input AC voltage Vin is abnormal or interrupted. When the input AC voltage Vin is normal, a battery charger (not shown) can be used to charge the battery 130 through the bus voltage provided by the buses 10a and 10b. When the input AC voltage Vin is abnormal or interrupted, the battery 130 can provide backup power. The current monitors CTA1 and CTA2 which are implemented by Hall effect current sensors are respectively mounted on the bus 10a, 10b and respectively coupled to the boost inductor L11, L12. The current monitors CTA1 and CTA2 are configured to measure the output current on the buses 10a and 10b, and the measured output current is provide for the microcontroller as a reference to activate the current sharing function and the over-current protection. The inverter circuit 140 is coupled to the output terminals of the boost rectifier 120 and includes a ladder of switches (Qa1, Qb1, Qc1, Qd1), a first output filter (La1, Ca1), and a second output filter (Lb1, Cb1). The inverter circuit 140 is configured to convert the positive output voltage and the negative output voltage of the boost rectifier circuit 120 into an AC voltage according to the on/off operations of the switches (Qa1, Qb1, Qc1, Qd1), and thereby generating a poly-phase AC voltage through the regulation of the first output filter (La1, Ca1) and the second output filter (Lb1, Cb1). The resultant poly-phase AC voltage is provided to a load (not shown) through output terminals 160.

FIG. 2 is a timing diagram showing the control signal waveforms used in the uninterruptible power supply of FIG. 1. Next, the operation of the uninterruptible power supply of FIG. 1 will be explored with reference to the timing diagram of FIG. 2. When the input AC voltage Vin is normal, that is, when the uninterruptible power supply 100 is working in the AC mode, the input AC voltage Vin is rectified so as to provide a positive DC voltage to the input terminal of the positive boost converter 122 and provide a negative DC voltage to the input terminal of the negative boost converter 123. By driving the transistor switches Q11 and Q12 with a 40-Hz switching control signal issued from the microcontroller, the positive boost converter 122 may generate a positive DC voltage across the output capacitor C11 and the negative boost converter 123 may generate a negative DC voltage across the output capacitor C12. When the input AC voltage Vin is abnormal or interrupted, that is, when the uninterruptible power supply 100 is working in the backup mode, the first silicon-controlled rectifier 151 is turned on under the manipulation of the microcontroller such that the battery 130 may respectively output a positive DC voltage and a negative DC voltage to the input terminal of the positive boost converter 122 and the input terminal of the negative boost converter 123. The positive DC voltage and the negative DC voltage outputted from the battery 130 are respectively boosted by the boost inductor L11 and the boost inductor L12, and thereby respectively generating an output DC voltage across the output capacitor C11 and the output capacitor C12 according to the on/off operations of the transistor switches Q11 and Q12.

Because the first silicon-controlled rectifier 151 is connected in series with the resistor R11, the resistor R11 may suppress the surge of the inrush current to achieve a smooth soft-start for the boost rectifier circuit 120. When the voltage on the buses 10a and 10b reaches a predetermined level, the second silicon-controlled rectifier 152 is turned on and the inverter circuit 140 converts the output voltages of the boost rectifier circuit 120 into a regulated AC voltage for use by a load.

However, the foregoing uninterruptible power supply 100 has some drawbacks needing to be solved. For example, when the uninterruptible power supply 100 is working in the backup mode, the DC currents outputted from the battery 130 may flow through the boost inductors L11 and L12. Because the boost inductors L11 and L12 are magnetic elements, a considerable power loss would generate within the uninterruptible power supply 100. Therefore, the conversion efficiency of the boost rectifier circuit 120 would be deteriorated. Furthermore, each bus requires to a current monitor being implemented by semiconductor devices to be placed thereon to measure the output current of the buses 10a and 10b. This would increase the manufacturing cost of the uninterruptible power supply.

It is therefore a tendency to develop an uninterruptible power supply with low cost and low power loss to address the above-mentioned problems.

SUMMARY OF THE INVENTION

An object of the present invention is to provide an uninterruptible power supply with reduced cost and power loss.

According to a best mode for carrying out the present invention, an uninterruptible power supply is provided and including an input circuit connected between a voltage input terminal and a rectifier circuit, in which the input circuit includes a boost inductor being charged by an AC current from the voltage input terminal for providing a boosted AC voltage to the rectifier circuit. The rectifier circuit is configured to convert the boosted AC voltage into an intermediate DC voltage, which is in turn converted into a poly-phase AC voltage by an inverter circuit.

According to the above conceptions, the input circuit further includes a circuit breaker connected to the voltage input terminal for receiving an input AC voltage and a current transformer connected in series between the circuit breaker and the boost inductor for measuring the AC current from the voltage input terminal.

According to the above conceptions, the uninterruptible power supply further includes a battery and a bus device, in which the bus device is connected with the rectifier circuit, the battery, and the inverter circuit.

According to the above conceptions, the rectifier circuit includes a rectifier for rectifying the boosted AC voltage into a rectified DC voltage having a predetermined voltage level, a converter connected to an output terminal of the rectifier and the bus device for converting the rectified DC voltage having a predetermined voltage level or the DC voltage outputted from the battery into an intermediate DC voltage, and an output capacitor for generating the intermediate DC voltage.

According to the above conceptions, the rectifier circuit further includes a current-limiting circuit connected in series between the buses and the battery, and a battery monitor being implemented by a Hall effect current sensor and connected in series between the current-limiting circuit and the battery for detecting the change of the output current of the battery.

According to the above conceptions, the rectifier circuit further includes a choke coil connected in series between the battery monitor and the current-limiting circuit for limiting the change rate of the output current of the battery.

Now the foregoing and other features and advantages of the present invention will be best understood through the following descriptions with reference to the accompanying drawings, wherein:

DETAILED DESCRIPTION OF THE PREFERRED EMBODIMENT

A preferred embodiment embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 3:
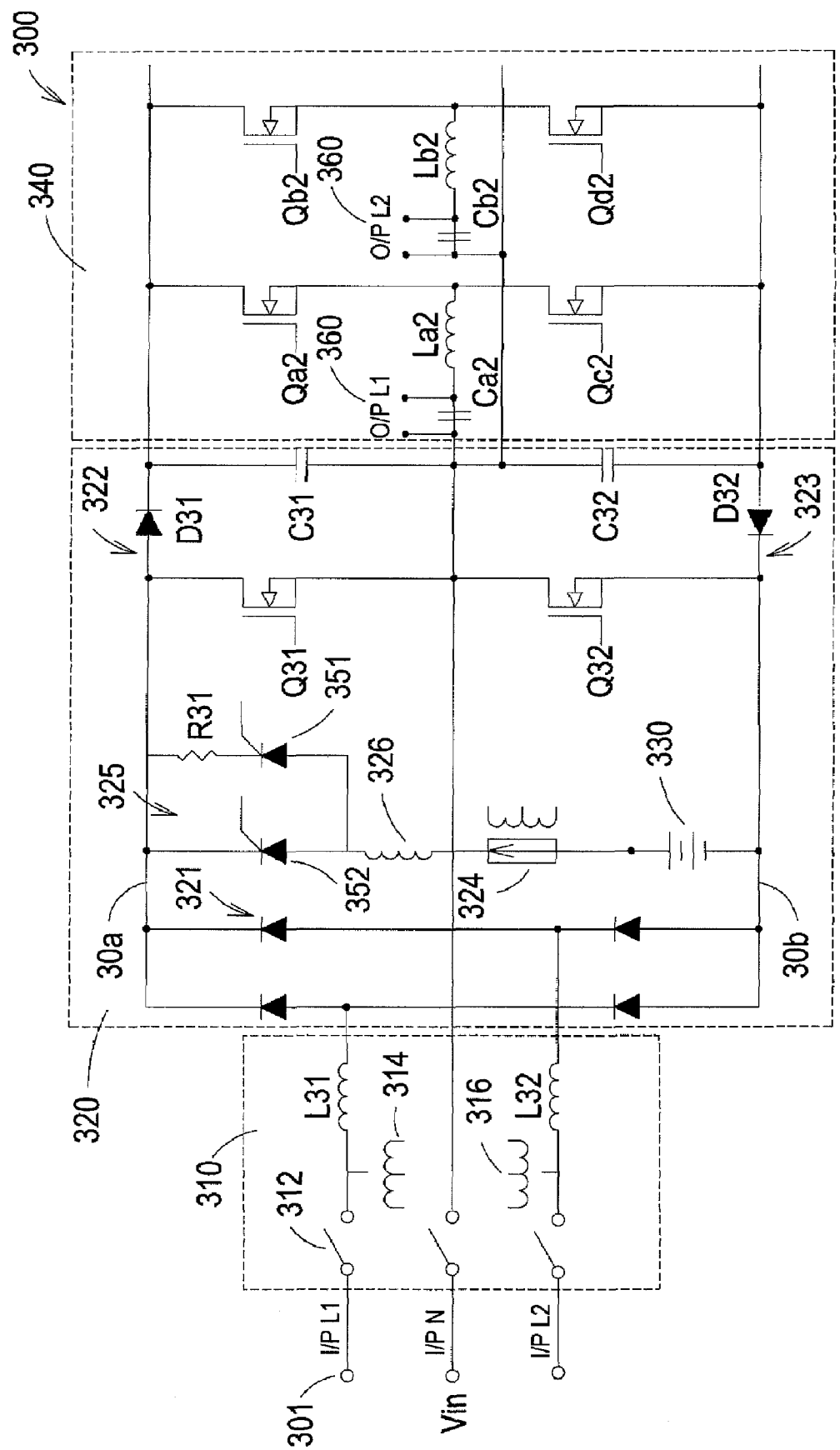
FIG. 3 illustrates a circuit diagram showing the construction of an on-line uninterruptible power supply according to a preferred embodiment of the present invention.

A first preferred embodiment of the present invention is illustrated in FIG. 3. As shown in FIG. 3 is an on-line uninterruptible power supply 300 including an input circuit 310, a rectifier circuit 320, a battery 330, and an inverter circuit 340, in which the rectifier circuit 320, the battery 330, and the inverter circuit 340 are interconnected by buses 30a, 30b. The input circuit 310 is connected between a voltage input terminal 301 and the rectifier circuit 320 for receiving an input AC voltage Vin and convert the input AC voltage Vin into a boosted AC voltage. The input circuit 310 includes a circuit breaker 312 for receiving the input AC voltage Vin and boost inductors L31, L32 connected to the circuit breaker 312. The boost inductor L31 is configured to be charged by an AC current in the positive half-cycle of the input AC voltage, and discharge the stored energy to the rectifier circuit 320 in the negative half-cycle of the input AC voltage. The boost inductor L32 is configured to be charged by an AC current in the negative half-cycle of the input AC voltage, and discharge the stored energy to the rectifier circuit 320 in the positive half-cycle of the input AC voltage. Therefore, the voltage level of the input AC voltage Vin can be boosted. The input circuit 310 further includes a current transformer 314 connected between the circuit breaker 312 and the boost inductor L31 and a current transformer 316 connected between the circuit breaker 312 and the boost inductor L32. The current transformers 314, 316 are made up of magnetic elements for measuring the AC current flowing from the voltage input terminal 301.

The rectifier circuit 320 is coupled between the input circuit 310 and the input terminals of the inverter circuit 340 for rectifying the boosted AC voltage outputted from the input circuit 310 and generating DC voltages on buses 30a, 30b. The rectifier circuit 320 includes a rectifier 321 which is made up of bridge-connected rectifying diodes for performing a half-wave rectification or full-wave rectification to the boosted AC voltage to generate a rectified DC voltage having a predetermined voltage level. The rectifier circuit 320 further includes: a positive converter 322 including a transistor switch Q31 and a diode D31; a negative converter 323 including a transistor switch Q32 and a diode D32; output capacitors C31, C32, a battery monitor 324; and a current-limiting circuit 325. The positive converter 322 is connected to a positive output terminal of the rectifier 321 and configured to receive a current outputted from the rectifier 321 in the positive half-cycle of the input AC voltage, and thereby charging the output capacitor C31 through the diode D31 according to the on/off operations of the transistor switch Q31. Therefore, a positive DC voltage is generated across the output capacitor C31. The negative converter 322 is connected to a negative output terminal of the rectifier 321 and configured to receive a current outputted from the rectifier 321 in the negative half-cycle of the input AC voltage, and thereby charging the output capacitor C32 through the diode D32 according to the on/off operations of the transistor switch Q32. Therefore, a negative DC voltage is generated across the output capacitor C32. The current-limiting circuit 325 is made up of a first silicon-controlled rectifier 351 and a second silicon-controlled rectifier 352 that are connected in parallel with each other. The first silicon-controlled rectifier 351 and the second silicon-controlled rectifier 352 are manipulated by a microcontroller (not shown) to allow the battery 330 to provide a current when the input AC voltage Vin is abnormal or interrupted, and thereby enabling the battery 330 to respectively provide a positive DC voltage and a negative DC voltage to an input terminal of the positive converter 322 and an input terminal of the negative converter 323. Therefore, output voltages can be respectively generated across the output capacitors C31 and C32 through the manipulation of the microcontroller. A resistor R31 is connected in series between the bus 30a and the first SCR 351 for protecting the battery 330 from the negative electrochemical effect as a result of a surging inrush current and preventing the shortening of the life of the battery 330.

The purpose of the battery 330 is to provide backup power for maintaining the power supplied to a load (not shown) when the input AC voltage Vin is abnormal or interrupted. When the input AC voltage Vin is normal, a battery charger (not shown) is configured to charge the battery 330 with the bus voltage provided by the buses 30a, 30b. Therefore, the battery 330 can output backup power when the input AC voltage Vin is abnormal or interrupted. The battery monitor 324 is connected in series between the current-limiting circuit 325 and the battery 330 and is implemented by Hall effect current sensor being made up of semiconductor devices. The battery monitor 324 is configured to detect the change of the output current of the battery 330 and protect the semiconductor devices placed on the current output path of the battery 330 from being damaged as a result of the peak current of the battery 330. The rectifier circuit 320 further includes a choke coil 326 which is connected in series between the battery monitor 324 and the current-limiting circuit 325 for limiting the change rate of the output current of the battery 330.

The inverter circuit 340 is connected to the output terminal of the rectifier circuit 320 and includes a ladder of switches (Qa2, Qb2, Qc2, Qd2), a first output filter (La2, Ca2), and a second output filter (Lb2, Cb2). The inverter circuit 340 is configured to convert the positive output voltage and the negative output voltage of the rectifier circuit 320 into an AC voltage according to the on/off operations of the switches (Qa2, Qb2, Qc2, Qd2), and regulate the generated AC voltages into a poly-phase AC voltage through the first output filter (La2, Ca2) and the second output filter (Lb2, Cb2). The poly-phase AC voltage is then provided to a load (not shown) through output terminals 360.

Figure 4:
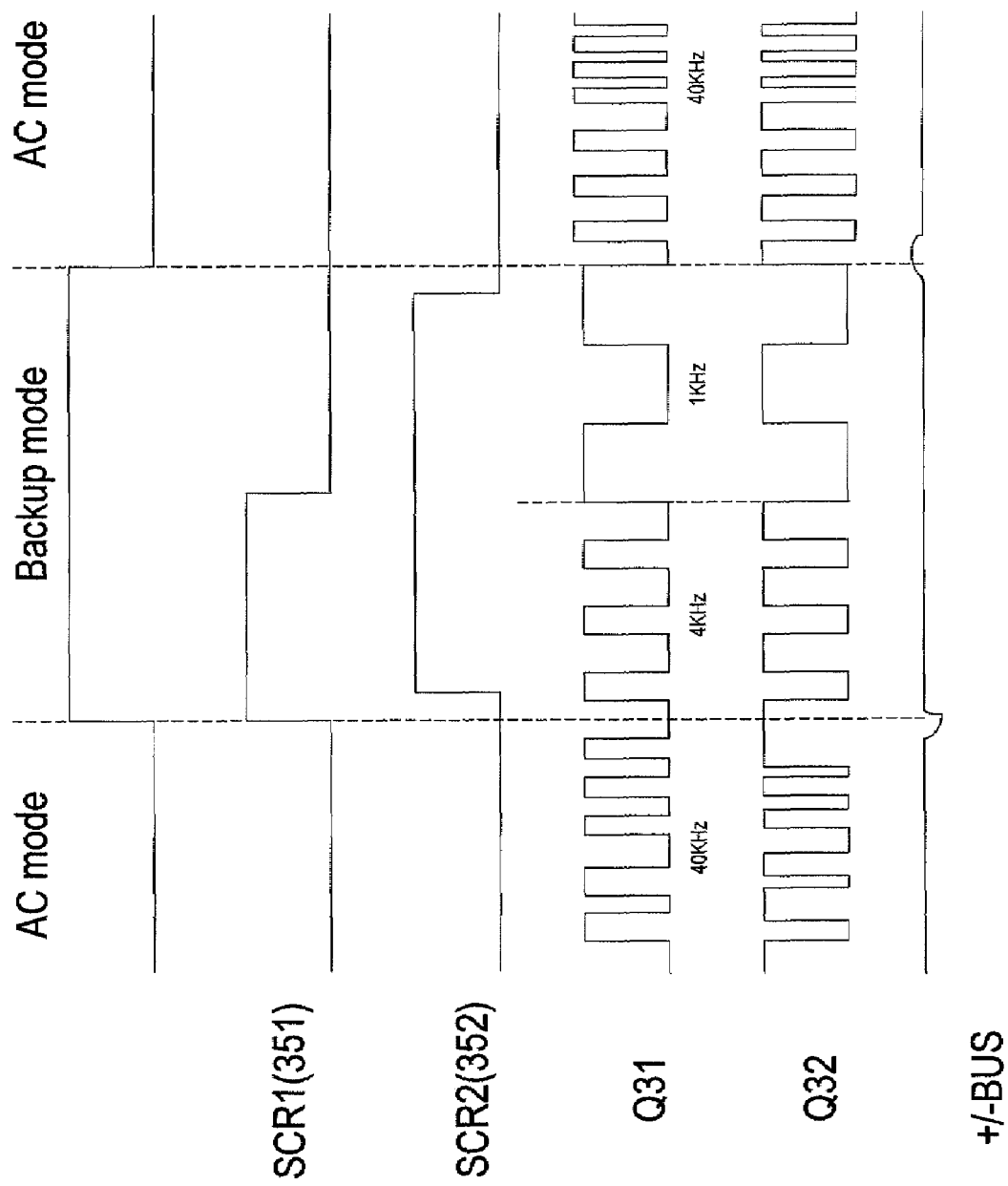
FIG. 4 illustrates a timing diagram showing the control signal waveforms used in the uninterruptible power supply of FIG. 3.

FIG. 4 shows a timing diagram for the signal waveforms measured from the circuitry of FIG. 3. The operation procedure of the circuitry of FIG. 3 will now be described with reference to the timing diagram of FIG. 4. When the input AC voltage Vin is normal, that is, the uninterruptible power supply 300 is working in the AC mode, the input AC voltage Vin is rectified by the rectifier 321 so as to respectively provide a positive voltage to the input terminal of the positive converter 322 and provide a negative voltage to the input terminal of the negative converter 323. By driving the transistor switches Q31 and Q32 with 40 kHz switching control signals, the positive converter 322 may generate a positive DC voltage across the output capacitor C31 and the negative converter 323 may generate a negative DC voltage across the output capacitor C32. When the input AC voltage Vin is abnormal or interrupted, the microcontroller is forced to switch the operation mode of the uninterruptible power supply 300 to the backup mode so as to enable the battery 330 to supply power. In the instant of the transition from the AC mode to the backup mode, the microcontroller will issue 4 kHz switch control signals to drive the transistor switches Q31 and Q32 to conduct alternately. Next, the first silicon-controlled rectifier 351 will conduct under the manipulation of the microcontroller such that the battery 330 may respectively output a positive DC voltage and a negative DC voltage to the input terminal of the positive converter 322 and the input terminal of the negative converter 323. The positive DC voltage and the negative DC voltage outputted from the battery 330 is converted according to the on/off operations of the transistor switches Q31 and Q32 so as to generate output voltages across the output capacitors C31 and C32. Because the first silicon-controlled rectifier 351 is connected in series with the resistor R11, the resistor R11 may suppress the surge of the inrush current to achieve a smooth soft-start for the rectifier circuit 320. When the voltage on the buses 10a and 10b reaches a predetermined level, the second silicon-controlled rectifier 352 is turned on and the microcontroller forces the switching frequency of the transistor switches Q31 and Q32 to go down to 1 kHz. Thus, the inverter circuit 340 may convert the output voltages of the rectifier circuit 320 into a regulated AC voltage for use by a load.

Figure 1:
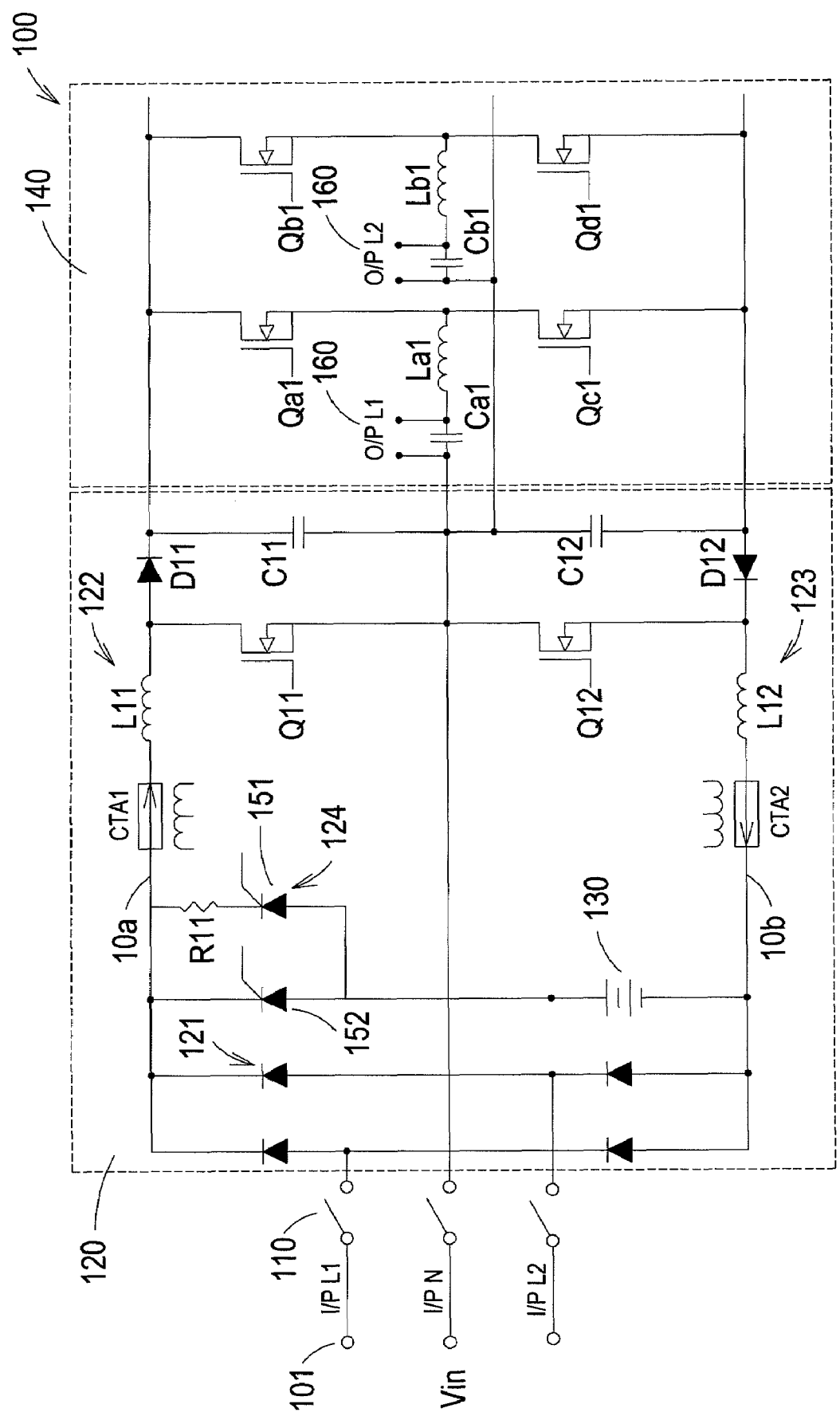
FIG. 1 illustrates a circuit diagram showing the construction of a conventional on-line uninterruptible power supply.
Figure 2:
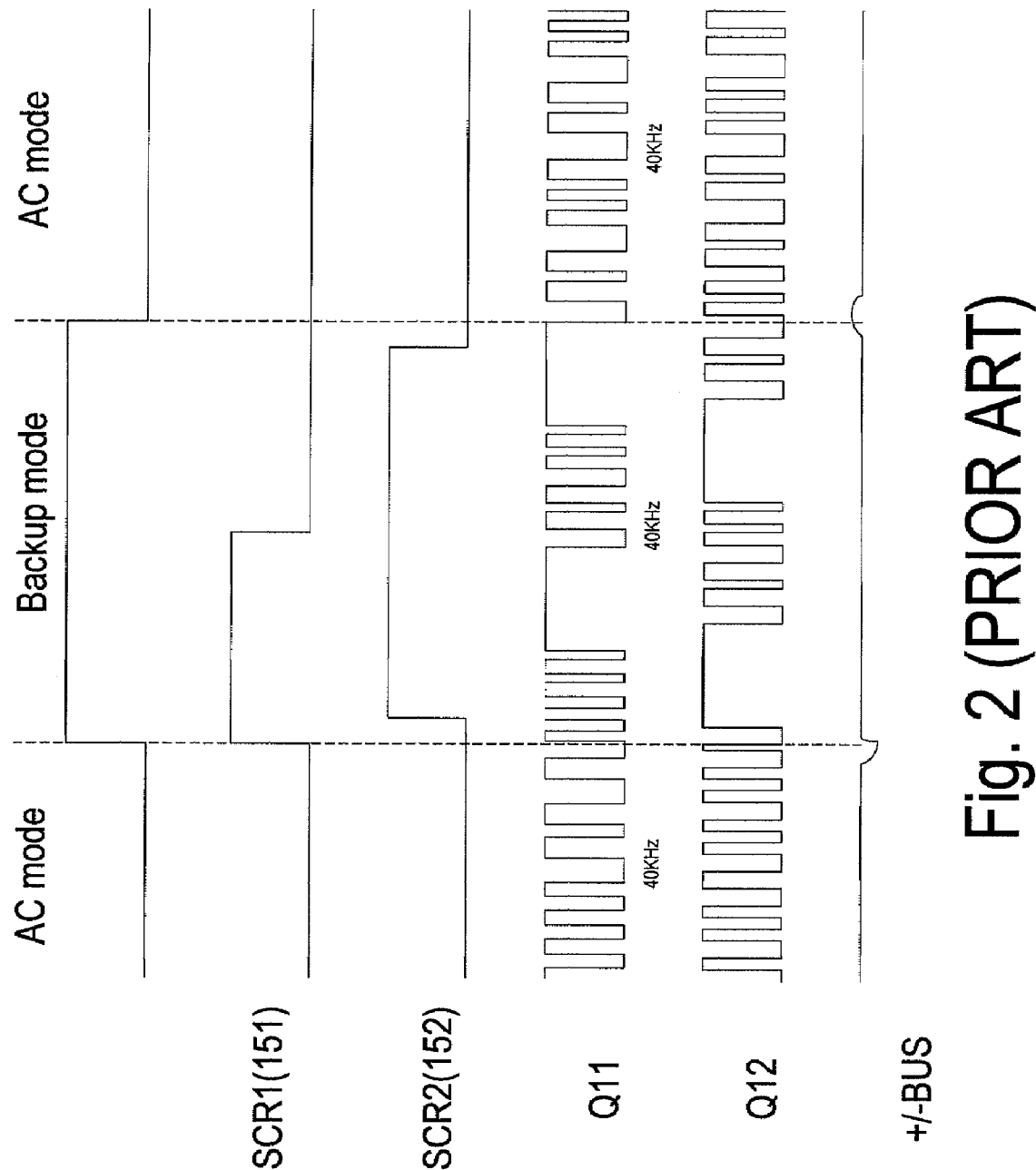
FIG. 2 illustrates a timing diagram showing the control signal waveforms used in the uninterruptible power supply of FIG. 1.

Compared with the conventional uninterruptible power supply of FIG. 1, it can be understood that the boost inductors L11 and L12 shown in FIG. 1 is relocated between the circuit breaker and the rectifier circuit. Therefore, when the uninterruptible power supply of FIG. 3 is working in the backup mode, the output current of the battery 330 will not flow through the boost inductors and cause excessive power losses. In this manner, the conversion efficiency of the rectifier circuit can be improved. Besides, it is to be noted that the choke coil 326 is simply used to limit the change rate of the output current of the battery 330 without having the function of voltage boosting. Therefore, the uninterruptible power supply according to the present invention can reduce the power loss generated therein in the backup mode operation and enhance the conversion efficiency of the rectifier circuit 320. Furthermore, the rectifier circuit 320 is configured to transfer the energy provided by the battery 330 directly to the buses 30a, 30b instead of performing voltage boosting operation, the choke coil does not require to be used to store energy therein and thereby downsizing the magnetic elements located within the rectifier circuit 320. More advantageously, in the instant of the transition from the AC mode to the backup mode, the microcontroller is forced to promote the switching frequency of the transistor switches Q31 first and Q32 and activate the current-limiting circuit 325, and thereby preventing the magnetic elements 326 from saturation and prohibiting the occurrence of over-current condition. When the voltage on the buses 30a and 30b reaches a predetermined value, the microcontroller is forced to lower the switching frequency of the transistor switches Q31 and Q32 so as to allow the battery 330 to output more energy to the buses 30a and 30b, thereby reducing the switching loss of the transistor switches Q31 and Q32.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An uninterruptible power supply, comprising
   an input circuit connected to a voltage input terminal for receiving an input AC voltage and including a boost inductor configured to be charged by an AC current from the voltage input terminal so as to provide a boosted AC voltage;
   a battery;
   a rectifier circuit connected to an output terminal of the input circuit for converting the boosted AC voltage or a DC voltage outputted from the battery into an intermediate DC voltage, wherein the rectifier circuit comprises a transistor switch, the boost inductor of the input circuit is charged and discharged by repetitive switching operations of the transistor switch so as to provide the boosted AC voltage, and the rectifier circuit further comprises a choke coil to limit the change rate of the output current of the battery and a battery monitor which is implemented by a Hall effect current sensor connected in series between the choke coil and the battery for detecting a change on an output current of the battery; and
   an inverter circuit connected to an output terminal of the rectifier circuit for converting the intermediate DC voltage into an output AC voltage.

2. The uninterruptible power supply according to claim 1 wherein the input circuit further comprises:
   a circuit breaker connected to the voltage input terminal for receiving the input AC voltage; and
   a current transformer connected between the circuit breaker and the boost inductor for measuring the AC current from the voltage input terminal.

3. The uninterruptible power supply according to claim 1 further comprising a bus device connected to the rectifier circuit, the battery, and the inverter circuit.

4. The uninterruptible power supply according to claim 3 wherein the rectifier circuit comprises:
   a rectifier for rectifying the boosted AC voltage into a rectified DC voltage having a predetermined voltage level;
   a converter connected to an output terminal of the rectifier and the bus device for converting the rectified DC voltage having a predetermined voltage level or a DC voltage from the battery into an intermediate DC voltage; and
   an output capacitor for generating the intermediate DC voltage.

5. The uninterruptible power supply according to claim 4 wherein the rectifier includes bridge-connected rectifying diodes.

6. The uninterruptible power supply according to claim 4 wherein the rectifier is a half-wave rectifier or a full-wave rectifier.

7. The uninterruptible power supply according to claim 4 wherein the converter includes a diode.

8. The uninterruptible power supply according to claim 4 wherein the rectifier circuit further comprises
   a current-limiting circuit connected in series between the bus device and the battery, wherein
   the battery monitor connected in series between the current-limiting circuit and the battery.

9. The uninterruptible power supply according to claim 8 wherein the choke coil is connected in series between the battery monitor and the current-limiting circuit.

10. An uninterruptible power supply, comprising
    an input circuit connected to a voltage input terminal for receiving an input AC voltage, including a boost inductor configured to be charged by an AC current from the voltage input terminal so as to provide a boosted AC voltage and a current transformer connected in series between the voltage input terminal and the boost inductor for measuring the AC current from the voltage input terminal;
    a bus device;
    a battery connected to the bus device;
    a rectifier circuit connected to an output terminal of the input circuit for converting the boosted AC voltage or a DC voltage outputted from the battery into an intermediate DC voltage, wherein the rectifier circuit comprises a transistor switch, the boost inductor of the input circuit is charged and discharged by repetitive switching operations of the transistor switch so as to provide the boosted AC voltage, and the rectifier circuit further comprises a choke coil to limit the change rate of the output current of the battery and a battery monitor which is implemented by a Hall effect current sensor connected in series between the choke coil and the battery for detecting a change on an output current of the battery; and
    an inverter circuit connected to an output terminal of the rectifier circuit for converting the intermediate DC voltage into an output AC voltage.

11. The uninterruptible power supply according to claim 10 wherein the input circuit further includes a circuit breaker connected in series between the voltage input terminal and the current transformer for receiving the input AC voltage.

12. The uninterruptible power supply according to claim 10 wherein the rectifier circuit comprises:
    a rectifier for rectifying the boosted AC voltage into a rectified DC voltage having a predetermined voltage level;
    a converter connected to an output terminal of the rectifier and the bus device for converting the rectified DC voltage having a predetermined voltage level or a DC voltage from the battery into an intermediate DC voltage; and
    an output capacitor for generating the intermediate DC voltage.

13. The uninterruptible power supply according to claim 12 wherein the rectifier includes bridge-connected rectifying diodes.

14. The uninterruptible power supply according to claim 12 wherein the rectifier is a half-wave rectifier or a full-wave rectifier.

15. The uninterruptible power supply according to claim 12 wherein the converter includes a diode.

16. The uninterruptible power supply according to claim 12 wherein the rectifier circuit further comprises
a current-limiting circuit connected in series between the bus device and the battery, wherein
the battery monitor connected in series between the current-limiting circuit and the battery.

17. The uninterruptible power supply according to claim 16 wherein the choke coil is connected in series between the battery monitor and the current-limiting circuit.

* * * * *